United States Patent
Savera et al.

(10) Patent No.: US 12,347,175 B2
(45) Date of Patent: Jul. 1, 2025

(54) SYSTEM AND METHODS TO OPTIMIZE NEURAL NETWORKS USING SENSOR FUSION

(71) Applicant: SIGNIFY HOLDING B.V., Eindhoven (NL)

(72) Inventors: Arhum Savera, Cambridge, MA (US); Shahin Mahdizadehaghdam, Milpitas, CA (US); Abhishek Murthy, Arlington, MA (US)

(73) Assignee: SIGNIFY HOLDING B.V., Eindhoven (NL)

( * ) Notice: Subject to any disclaimer, the term of this patent is extended or adjusted under 35 U.S.C. 154(b) by 238 days.

(21) Appl. No.: 18/011,210

(22) PCT Filed: Jun. 18, 2021

(86) PCT No.: PCT/EP2021/066675
§ 371 (c)(1),
(2) Date: Dec. 19, 2022

(87) PCT Pub. No.: WO2021/259806
PCT Pub. Date: Dec. 30, 2021

(65) Prior Publication Data
US 2023/0237784 A1 Jul. 27, 2023

Related U.S. Application Data

(60) Provisional application No. 63/044,037, filed on Jun. 25, 2020.

(30) Foreign Application Priority Data

Sep. 24, 2020 (EP) .................................. 20198009

(51) Int. Cl.
*G06V 10/80* (2022.01)
*G06V 10/26* (2022.01)
(Continued)

(52) U.S. Cl.
CPC ............ *G06V 10/803* (2022.01); *G06V 10/26* (2022.01); *G06V 10/82* (2022.01); *G06V 20/52* (2022.01)

(58) Field of Classification Search
CPC ...... G06V 10/803; G06V 20/52; G06V 10/82; G06V 10/26
See application file for complete search history.

(56) References Cited

U.S. PATENT DOCUMENTS 10,666,856 B1   5/2020   Rueckner
2016/0003493 A1   1/2016   Katz
(Continued)

FOREIGN PATENT DOCUMENTS

CN   110888121 A   3/2020
EP   3806036 A1   4/2021

OTHER PUBLICATIONS

Chavez-Garcia, et al., "Multiple Sensor Fusion and Classification for Moving Object Detection and Tracking," Hal Open Science, IEEE Transactions On Intelligent Transportation Systems, 2015 (12 Pages).

(Continued)

*Primary Examiner* — David Perlman (57) ABSTRACT

A method for optimizing a neural network is provided, including: (1) capturing, via a first sensor group having a first field of view, a first sample set having a first sensor domain corresponding to the first field of view; (2) capturing, via a second sensor group having a second field of view, a second sample set having a second sensor domain corresponding to the second field of view; (3) generating regions of interest of the second sample set; (4) translating the regions of interest to the first sensor domain; (5) identifying nodes of the neural network which correspond to the translated regions; and (6) optimizing the neural network by at least one of (a) increasing the weight value of the nodes (Continued)

corresponding to the one or more translated regions and (b) decreasing the weight value of the nodes not corresponding to the one or more translated regions.

11 Claims, 8 Drawing Sheets

(51) Int. Cl.
*G06V 10/82* (2022.01)
*G06V 20/52* (2022.01)

(56) References Cited

U.S. PATENT DOCUMENTS

| | | | |
|---|---|---|---|
| 2019/0279009 A1* | 9/2019 | Srirangam Narashiman et al. | G06T 7/248 |
| 2019/0347538 A1 | 11/2019 | Lee | |
| 2020/0012898 A1 | 1/2020 | Zhao et al. | |
| 2020/0012904 A1 | 1/2020 | Zhao et al. | |
| 2020/0088881 A1 | 3/2020 | Cionca et al. | |
| 2020/0104584 A1 | 4/2020 | Zheng et al. | |

OTHER PUBLICATIONS

Chang, Shuo, et al., "Spatial Attention Fusion for Obstacle Detection Using Mmwave Radar and Vision Sensor," Sensors, MDPI, www.mdpi.com/Journal/Sensors, 2020 (21 Pages).

Eppel, Sagi, "Classifying a Specific Image Region Using Convolutional Nets With an Roi Mask as Input," https://arxiv.org/abs/1812.00291, 2018 (8 Pages).

Wallenberg, Marcus, et al., "Attentional Masking for Pre-Trained Deep Networks," Proceedings of IEEE/RSJ International Conference On Intelligent Robots and Systems (IROS17), 2017 (7 Pages).

Srivastava, Nitish, et al., Dropout: A Simple Way To Prevent Neural Networks From Overfitting, Journal of Machine Learning Research, 15, 2014 (30 Pages).

Dai, Jifeng, et al., "Convolutional Feature Masking for Joint Object and Stuff Segmentation," https://arxiv.org/abs/1412.1283, 2014 (10 Pages).

Wang, Xiao, et al., "On-Road Vehicle Detection and Tracking Using Mmw Radar and Monovision Fusion," IEEE Transactions On Intelligent Transportation Systems, vol. 17, No. 7, Jul. 2016 (10 Pages).

Ji, Zhengping, et al., "Radar-Vision Fusion for Object Classification," Proceedings of The IEEE 2008 11th International Conference On Information Fusion, Cologne, Germany Jun.-Jul. 2008 (7 Pages).

* cited by examiner

SYSTEM AND METHODS TO OPTIMIZE NEURAL NETWORKS USING SENSOR FUSION

CROSS-REFERENCE TO PRIOR APPLICATIONS

This application is the U.S. National Phase application under 35 U.S.C. § 371 of International Application No. PCT/EP2021/066675, filed on Jun. 18, 2021, which claims the benefit of U.S. Provisional Patent Application No. 63/044,037, filed on Jun. 25, 2020 and European Patent Application No. 20198009.1, filed on Sep. 9, 2020. These applications are hereby incorporated by reference herein.

FIELD OF THE DISCLOSURE

The present disclosure is directed generally to optimizing neural networks through fusion of data captured by sensors of different modes.

BACKGROUND

Deep learning neural networks typically include multiple intermediate layers of nodes resulting in large and complicated receptive fields and activation maps. However, in many cases, the majority of the data in these receptive fields and activation maps will be unnecessary for the goal of the network. For example, a thermal image analyzed by a neural network trained for activity detection may only contain relevant information in its upper-right quadrant. Thus, the processing of the receptive fields corresponding to the other three quadrants results in wasted computing time and energy. Accordingly, there is a need for (1) identifying relevant portions of the receptive field and (2) focusing on the relevant portions.

US 2016/003493A1 discloses a passive infrared (PIR) motion sensor system which includes a non-contact thermopile detector for capturing infrared energy from a focused upon area in a room or zone deemed most likely to be occupied and generating a thermopile temperature signal therefrom, a pyroelectric detector for viewing through multiple passive lens elements (lenslets) that form PIR beams from a large portion of the room or zone and generating a pyroelectric signal therefrom, an ambient temperature sensor for sensing an ambient temperature in the room or zone and generating an ambient temperature signal detection threshold that is utilized in PIR detection therefrom and a microcomputer configured to process the thermopile temperature signal, the pyroelectric signal and the ambient temperature signal and determine whether the room or zone is occupied or unoccupied.

SUMMARY OF THE DISCLOSURE

Connected lighting systems include sensor bundles to capture samples used to control their associated luminaires. The sensor bundles may include different types of sensors, such as thermopile sensors and passive infrared (PIR) sensors. The connected lighting system may implement a neural network to process the samples collected by one of the sensor modes to control its associated luminaire. For example, the neural network may detect activity in a defined space by processing the data collected by the thermopile sensors.

The present disclosure is directed generally to optimizing such a neural network through fusion of the data captured by the sensors of different modes. This optimization system utilizes two modalities of sensors of varying granularity, such as a first group of thermopiles and a second group of PIR sensors. The system locates one or more regions of interest in the data captured by the second group, and translates this data from the sensor domain of the second group to the sensor domain of the first. The system then creates a binary matrix corresponding to the translated data. The binary matrix is loaded into the neural network to identify the nodes of the network which correspond to the translated regions of interest. Accordingly, these identified nodes also correspond to the relevant receptive fields of the thermopile data to be processed by the network. The system may then optimize the neural network by increasing or decreasing weight values of the nodes of the network based on relevance.

Generally, in one aspect, a method for optimizing a neural network is provided. The method may include capturing, via a first sensor group having a first field of view, a first sample set. The first sensor group may include at least one multipixel thermopile. The first sample set may have a first sensor domain. The first sensor domain may correspond to the first field of view. The first sample set may be a thermal image corresponding to the first field of view.

The method may further include capturing, via a second sensor group having a second field of view, a second sample set. The second sensor group may include at least one passive infrared (PIR) sensor. The second sample set may have a second sensor domain. The second sensor domain may correspond to the second field of view. The second field of view may overlap at least a portion of the first field of view. The first sample set may be larger in size than the second sample set.

The method may further include generating one or more regions of interest of the second sample set. The one or more regions of interest may be generated based on at least an object segmentation algorithm. The one or more regions of interest may be generated based on at least a user preference dataset.

The method may further include translating the one or more regions of interest from the second sensor domain to the first sensor domain.

The method may further include identifying one or more nodes of the neural network which correspond to the one or more translated regions of interest. The neural network may include a plurality of layers. Each layer may include a plurality of nodes. Each node may have a weight value.

The nodes of the neural network corresponding to the translated regions of interest may be identified by (1) feeding a binary input matrix into the neural network and (2) detecting the nodes of the neural network which are activated by feeding the binary matrix. The binary input matrix may be equal in dimension to the first sample set. The binary input matrix may include one or more zero entries corresponding to the areas outside of the translated regions of interest. The binary input matrix may include one or more non-zero entries corresponding to the translated regions of interest.

The method may further include optimizing the neural network by at least one of (1) increasing the weight value of the nodes corresponding to the one or more translated regions of interest and (2) decreasing the weight value of the nodes not corresponding to the one or more translated regions of interest. The weight value of the nodes not corresponding to the one or more translated regions of interest may be set to 0.

Generally, in another aspect, a system for optimizing a neural network is provided. The system may include a controller. The controller may be communicatively coupled to a first sensor group. The first sensor group may have a first field of view. The first sensor group may be configured to capture a first sample set. The first sample set may have a first sensor domain. The first sensor domain may correspond to the first field of view. The first sensor group may include at least one multipixel thermopile.

The controller may be communicatively coupled to a second sensor group. The second sensor group may have a second field of view. The second field of view may correspond to the second sensor domain. The second sensor group may be configured to capture a second sample set. The second sample set may have a second sensor domain. The second field of view may overlap at least a portion of the first field of view. The second sensor group may include at least one PIR sensor. The second sensor group may include at least one microphone. The second sensor group may include at least one camera.

The controller may be configured to segment a region of interest from the second sample set. The controller may be further configured to translate the region of interest from the second sensor domain to the first sensor domain.

The controller may be further configured to identify one or more nodes of the neural network which correspond to the translated region of interest based on a binary matrix. The binary matrix may include one or more zero entries corresponding to areas outside of the translated region of interest. The neural network may include a plurality of layers. Each layer may include a plurality of nodes. Each node may have a weight value.

The controller may be further configured to optimize the neural network by at least one of (1) increasing the weight value of the nodes corresponding to the one or more translated regions of interest (2) decreasing the weight value of the nodes not corresponding to the one or more translated regions of interest.

In various implementations, a processor or controller may be associated with one or more storage media (generically referred to herein as "memory," e.g., volatile and non-volatile computer memory such as RAM, PROM, EPROM, and EEPROM, floppy disks, compact disks, optical disks, magnetic tape, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects as discussed herein. The terms "program" or "computer program" are used herein in a generic sense to refer to any type of computer code (e.g., software or microcode) that can be employed to program one or more processors or controllers.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

These and other aspects of the various embodiments will be apparent from and elucidated with reference to the embodiment(s) described hereinafter.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the various embodiments.

DETAILED DESCRIPTION OF EMBODIMENTS

The present disclosure is directed generally to optimizing a neural network through fusion of data captured by sensors of different modes. The system utilizes two modalities of sensors of varying granularity, such as a first group of thermopiles and a second group of passive infrared (PIR) sensors. The system locates one or more regions of interest in the data captured by the second group, and translates this data from the sensor domain of the second group to the sensor domain of the first. The system then creates a binary matrix corresponding to the translated data. The binary matrix is loaded into the neural network to identify the nodes of the network which correspond to the translated regions of interest. Accordingly, these identified nodes also correspond to the relevant receptive fields of the thermopile data to be processed by the network. The system may then optimize the neural network by increasing or decreasing weight values of the nodes of the network based on relevance. Once the neural network is optimized, the data captured by the first group of sensors may be processed in a more efficient manner by focusing on the most relevant receptive fields of the data captured by the first group of thermopiles.

Figure 1:
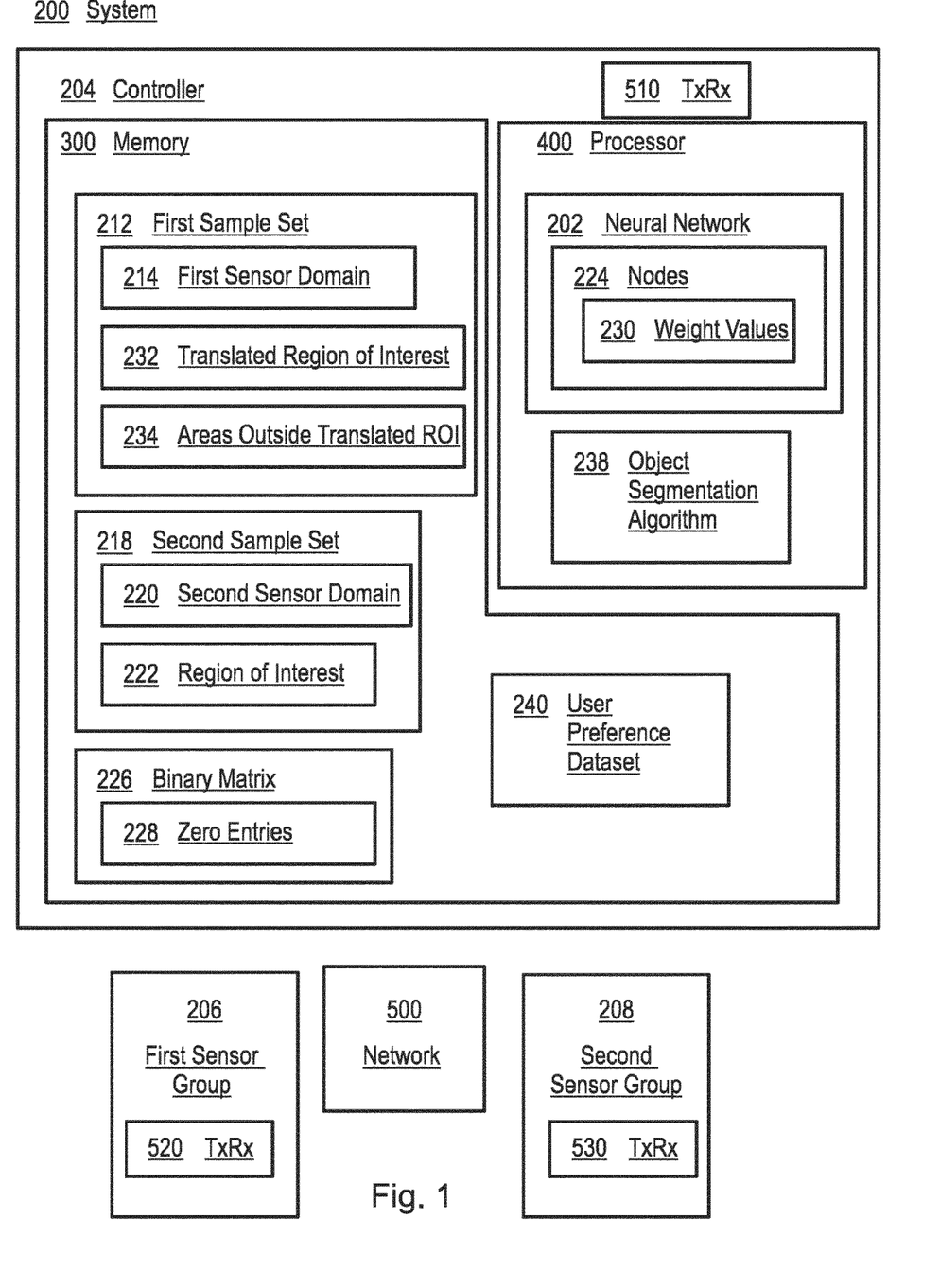
FIG. 1 is a schematic of a system for optimizing a neural network, in accordance with an example.
Figure 2:
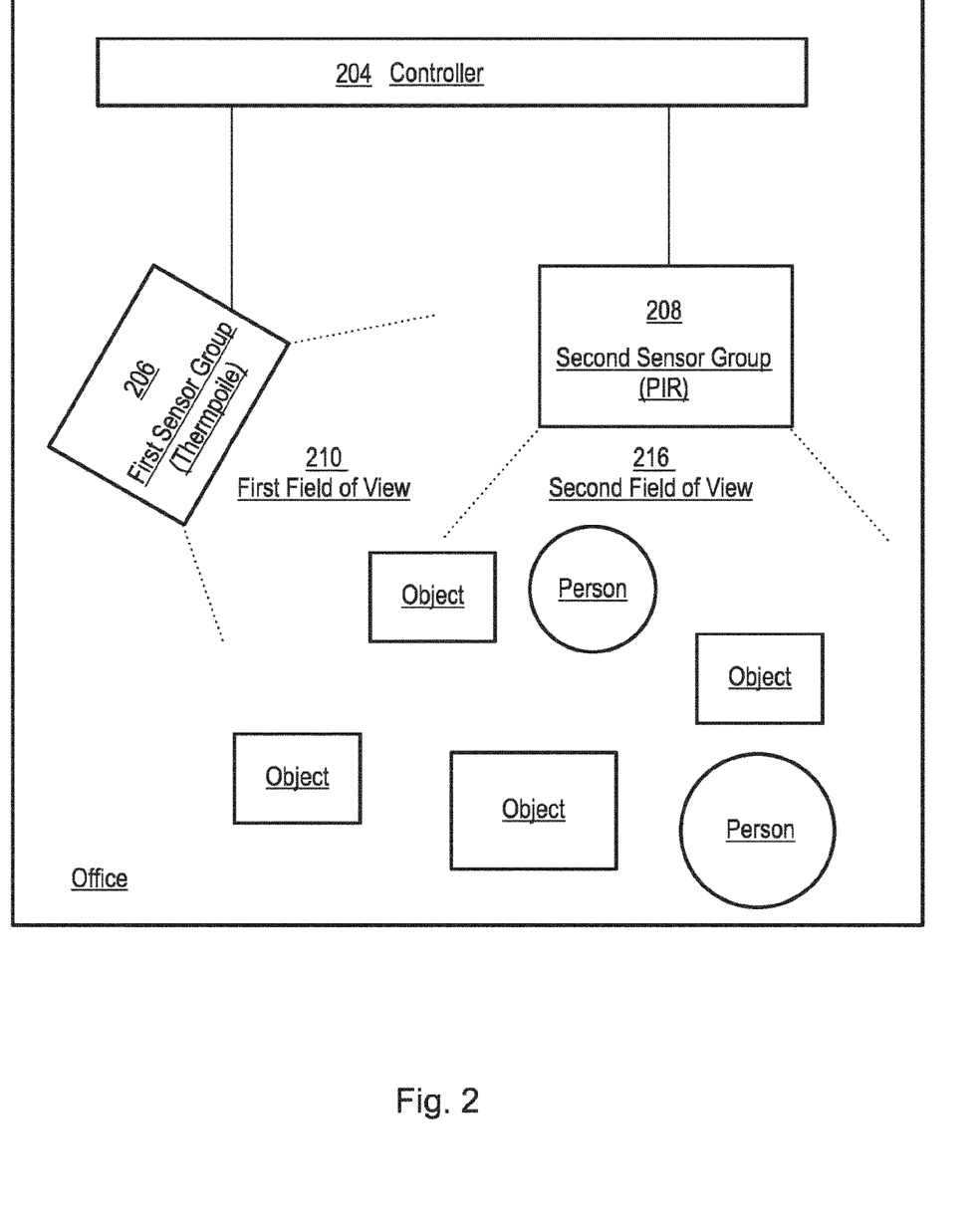
FIG. 2 is a further schematic of a system for optimizing a neural network, in accordance with an example.

Referring to FIGS. 1 and 2, in one aspect, a system 200 for optimizing a neural network 202 is provided. The neural network 202 may be a convolutional neural network. The neural network 202 may include a plurality of layers. Each layer may include a plurality of nodes 224. Each node 224 may have a weight value 230.

In a preferred embodiment, the neural network 202 may be utilized for activity detection in a detection area, such as an office space. Additionally, other use cases for neural networks 202 are known, such as occupancy detection, people counting, and facial detection. Variations of the present systems and methods can generally be used in almost any object detection application with two sources of imagery. For example, in a people counting application, a system may use thermopile samples to identify regions of interest in a neural network for processing RGB (Red-Green-Blue) images.

With respect to activity detection, the neural network 202 is configured to process samples collected by one or more sensors monitoring the detection area. These sensors may be embedded in luminaires arranged in a connected lighting system in the office space.

The system 200 may include a controller 204, a first sensor group 206, and a second sensor group 208 capable of communication via wired and/or wireless network 500. With reference to FIG. 1, the controller 204 may include a memory 300, a processor 400, and a transceiver 510. The memory 300 and processor 400 may be communicatively coupled via a bus to facilitate processing of data stored in memory 300. Transceiver 510 may be used to receive samples from the first 206 and second 208 sensor group via the network 500. The data received by the transceiver 510 may be stored in memory 300 and/or processed by processor 400. In an example, the transceiver 510 may facilitate a wireless connection between the controller 204 and the network 500.

The network 500 may be configured to facilitate communication between the controller 204, the first sensor group 206, the second sensor group 208, and/or any combination thereof. The network 400 may be a wired and/or wireless network following communication protocols such as Bluetooth, Wi-Fi, Zigbee, and/or other appropriate communication protocols. In an example, the sensors 206, 208 may wirelessly transmit, via the network 500, the samples 212, 218 to the controller 204 for storage in memory 300 and/or processing by the processor 400.

The controller 204 may be communicatively coupled to a first sensor group 206 over a wired and/or wireless network 500 as described herein. The first sensor group 206 may further include a transceiver 520 to wirelessly communicate with other components of the system 200 via network 400.

The first sensor group 206 may have a first field of view 210. As shown in FIG. 2, the first field of view 210 defines the extent of the observable environment, such as an office space, captured by the first sensor group 206. The first field of view 210 may be adjusted in a number of ways, including via placement or orientation of the sensors 206, or by adjusting the physical and/or digital characteristics of the sensors 206.

The first sensor group 206 may be configured to capture a first sample set 212. The first sample set 212 includes data to be processed by the neural network 202 for one or more purposes, such as activity detection. The second sample set 218, described below, is used by the system 202 to optimize the neural network 202 such that the first sample set 212 is processed in a more efficient manner.

The first sample set 212 has a first sensor domain 214. The first sensor domain 214 is defined by the first field of view 210 of the first sensor group 206. Accordingly, the dimensions of the first sensor domain 214 represent the extent of the observable environment represented by the first sample set 212.

Figure 3:
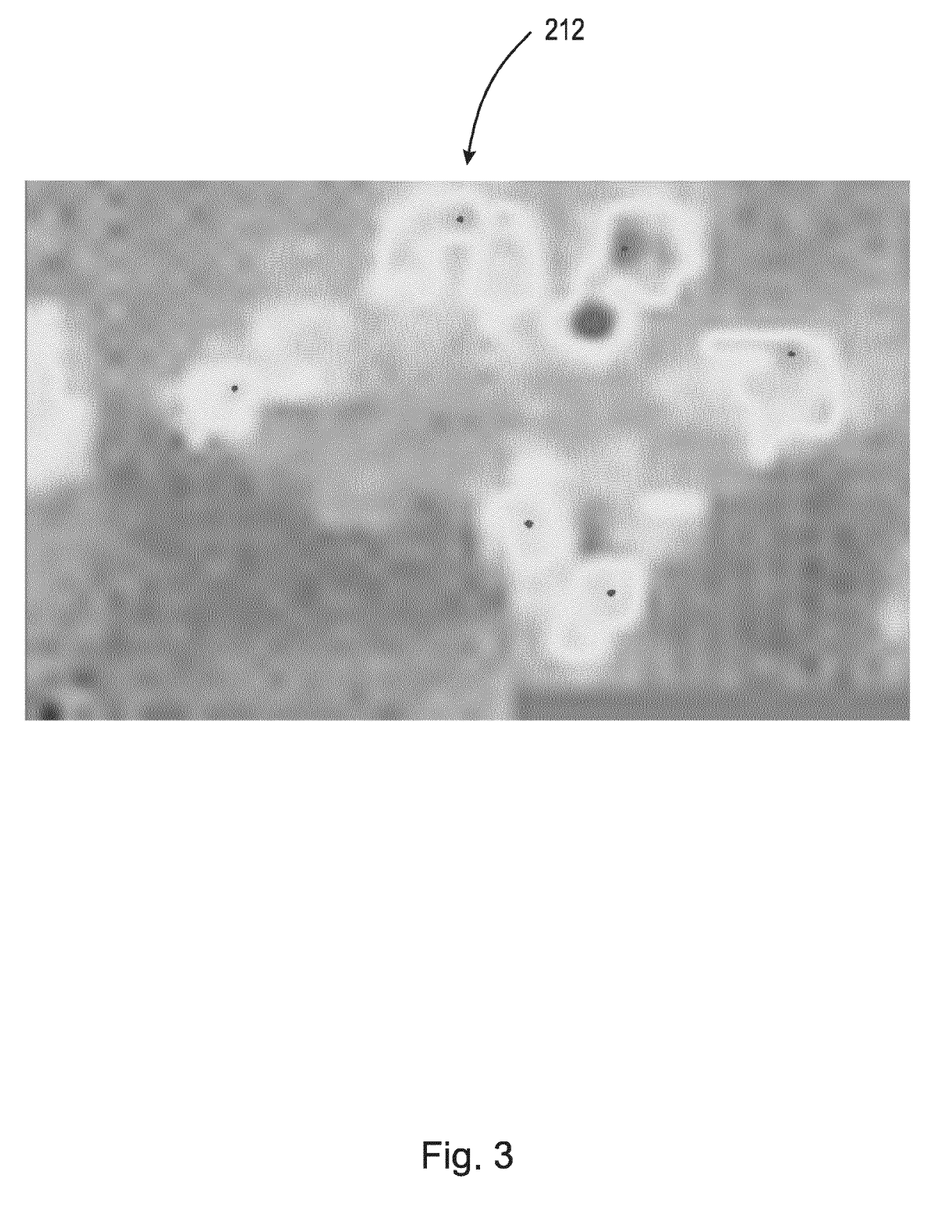
FIG. 3 is a thermal image generated by one or more multipixel thermopiles, in accordance with an example.

The first sensor group 206 may include at least one multipixel thermopile. The first sample set 212 may be a thermal image corresponding to the first field of view 210. FIG. 3 shows an example thermal image generated by a multipixel thermopile. Thermopile sensors are comprised of a series of thermocouples, wherein each thermocouple is a thin wire made of two materials of different thermal activity. When a temperature difference occurs between the two ends of the wire, an electrical tension develops. The hot junctions are concentrated on a very thin common absorbing area, while the cold junctions are located on a surrounding heat sink with high thermal mass. In one example, the multipixel thermopile may be a MLX90640. The MLX90640 is a fully calibrated 32×24 pixel thermal infrared array in an industry standard 4-lead TO39 package with a digital interface. The MLX90640 contains 768 far infrared sensing elements. An ambient sensor is also integrated to measure the ambient temperature. The output of the sensor is a thermal image as shown in FIG. 3.

The controller 204 may be communicatively coupled to a second sensor group 208. The second sensor group 208 may further include a transceiver 530 to wirelessly communicate with other components of the system 200 via network 400.

The second sensor group 208 may have a second field of view 216. The second field of view 216 may correspond to the second sensor domain 220. The second sensor group 208 may be configured to capture a second sample set 218. The second sample set 218 may include samples of a different modality than the first sample set 212. The difference in modality may result from different sensor types used to collect the first sample set 212 and the second sample set 218. As shown in FIG. 2, the second field of view 216 may overlap at least a portion of the first field of view 210.

In a preferred embodiment, the second sensor group 208 may include at least one passive infrared ("PIR") sensor. The PIR sensors may be configured to capture light radiating from persons and objects in the second field of view 216 as the second sample set 218. As the PIR sensors are passive, the PIR sensors do not radiate energy for detection purposes. Rather, the PIR sensors simply detect radiant heat emitted by or reflected from objects in their field of view.

In a further example, the second sensor group 208 may include at least one microphone configured to capture audio emitted by persons and objects in the second field of view 216. In an even further example, the second sensor group 208 may include at least one camera, such as a PointGrab camera, configured to capture images of persons and objects in the second field of view 216. In another example, the first 206 and second 208 sensor groups may be bundled together and mounted to a luminaire or similar fixture arranged in an office space.

In a preferred example, the first sample set 212 may be larger in size than the second sample set 218. For example, the sample set captured by a typical multipixel thermopile for an area is usually much larger than the sample set captured by a typical PIR sensor for the same area. In other words, the data captured by the first sensor group 212 may be significantly denser than the data captured by the second sensor group 218. In this preferred example, the smaller, second sample set 218 is utilized by the system 200 to optimize the neural network 202 used to process the much larger, first sample set 212 such that the neural network 202 will function more efficiently. While the system 200 may still function if the size of the second sample set 218 is greater than or equal to the size of the first sample set 212, the computational benefits achieved through the efficient processing of the first sample set 212 will be at least somewhat offset by the increased computation requirements associated with the larger second sample set 218.

Figure 5A:
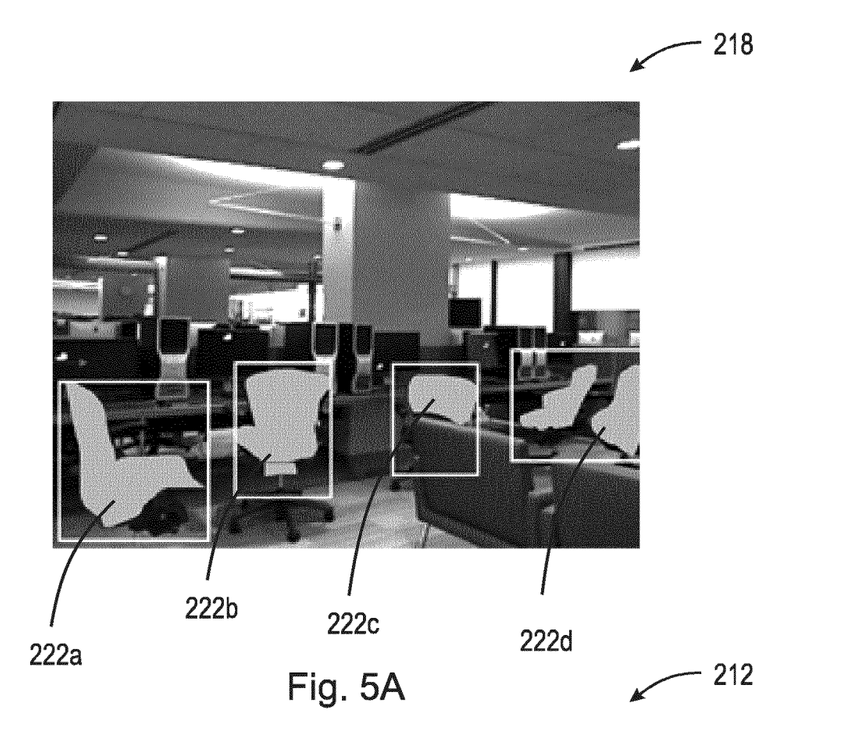
FIGS. 5A and 5B demonstrates how the system translates the identified regions of interest, in accordance with an example.

The controller 204 may be configured to generate of a region of interest 222 in the second sample set 218. A region of interest 222 may be any portion of the second sample set 218 representing portions of the area of interest to focus on during neural network processing. The regions of interest may be selected based on some prior knowledge of the application. For example, if the system 200 is directed to people counting, the areas of interest 222 may be near chairs or desks. Therefore, after running the image segmentation algorithm (described below) on a specific image sample, the partitions which are most relevant to the task in-hand will be selected and retrieved. For example, and as shown in FIG. 5A, regions of interest 222a-222d may include portions of the second sample set 218, including one or more chairs. In order to generate the region of interest 222, the controller 204 may be further configured to segment the region of interest 222 from the second sample set 218. In another embodiment, the controller 204 may generate the region of interest 222 based on user input indicative of the region of interest.

In one example, the regions of interest 222 may be segmented from the second sample set 218 based on at least an object segmentation algorithm 238. The object segmentation algorithm 238 defines the process of segmenting an image into multiple partitions. The object segmentation algorithm 238 represents each image with labels that are more meaningful and more natural to analyze. This object segmentation algorithm 238 is often used to mark objects, boundaries, and assign labels. In the present application, state of the art image segmentation algorithms such as Mask-RCNN (Regions with Convolutional Neural Networks) may be applicable. The object segmentation algorithm 238 will typically be run on the entire dataset or image. Further, the object segmentation algorithm 238 may be configured to focus on particular areas within the dataset or image based on context information indicating which areas are most relevant. The object segmentation algorithm 238 should require significantly less processing power than a standard neural network.

Figure 4A:
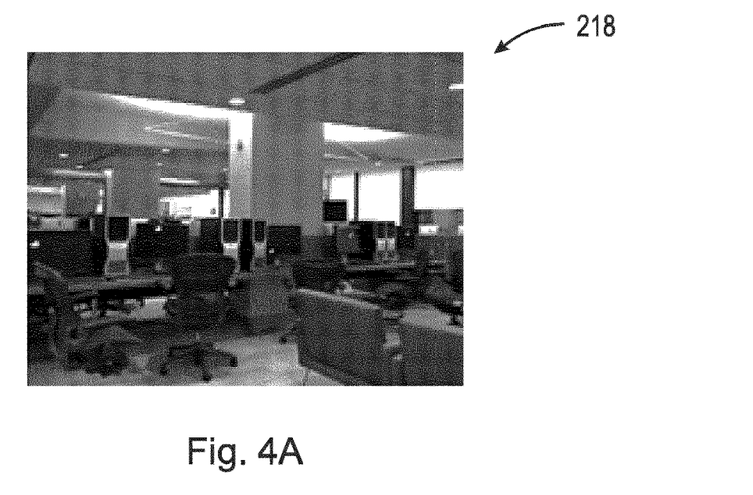
FIGS. 4A-4C demonstrates how the system identifies regions of interest in data collected by the second sensor group, in accordance with an example.

FIG. 4A shows an image representative of the second sample set 218 to be segmented by the object segmentation algorithm 238. In this example, the image of the second sample set 218 may have been captured by a PointGrab camera. Further to this example, the first sensor group 206 may be a multipixel thermopile camera. The data captured by the multipixel thermopile camera is significantly more dense than the data captured by the PointGrab camera. Accordingly, the system 200 utilizes the data of the second sample set 218 to focus the neural network 202, allowing the neural network to process the first sample set 212 in a more efficient manner.

Figure 4B:
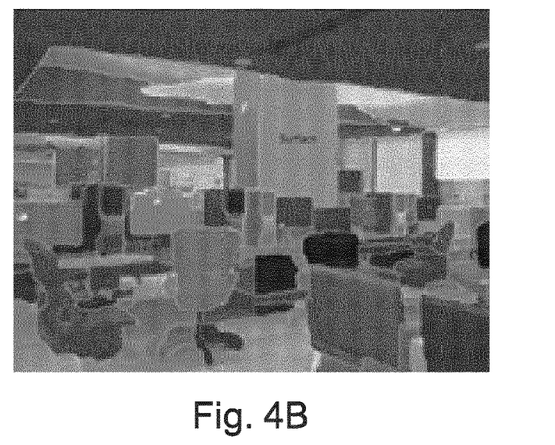
Figure 4C:
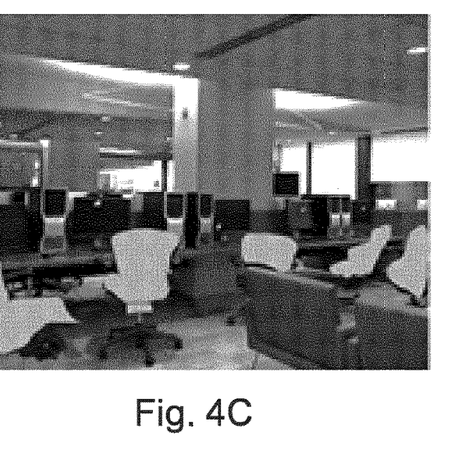

As seen in FIG. 4A, the image represents a portion of an open office environment based on the field of view 216 of the second sensor group 208, including a number of objects such as desk chairs, computers, and tables. The image also captures aspects of the room itself, such as the floor, ceiling, walls, windows, and luminaires. FIG. 4B demonstrates how an object segmentation algorithm may partition the second sample set 218 into regions corresponding to office furniture and fixtures. For example, FIG. 4B shows outlines around the various objects in the office, including the desk chairs in the lower portion of the image. FIG. 4C demonstrates how the controller 204 may then identify regions encompassing the five desk chairs as regions of interest 222. The regions of interest 222 may be identified based on prior knowledge of the application of the system 200. For example, if the system 200 is directed to people counting, the regions of interest 222 may be near chairs, desks, or other regions where people are likely to be present. Therefore, after running the object segmentation algorithm 238 on a specific image sample, the regions which are most relevant to the application will be identified and further processed.

In a further example, the region of interest 222 may be segmented based on at least a user preference dataset 240. The user preference dataset 240 may be stored in memory. The user preference dataset 240 may correspond to historical data of previous segmentations, as well as data input into the system directly or indirectly by a user via a user interface.

Figure 5B:
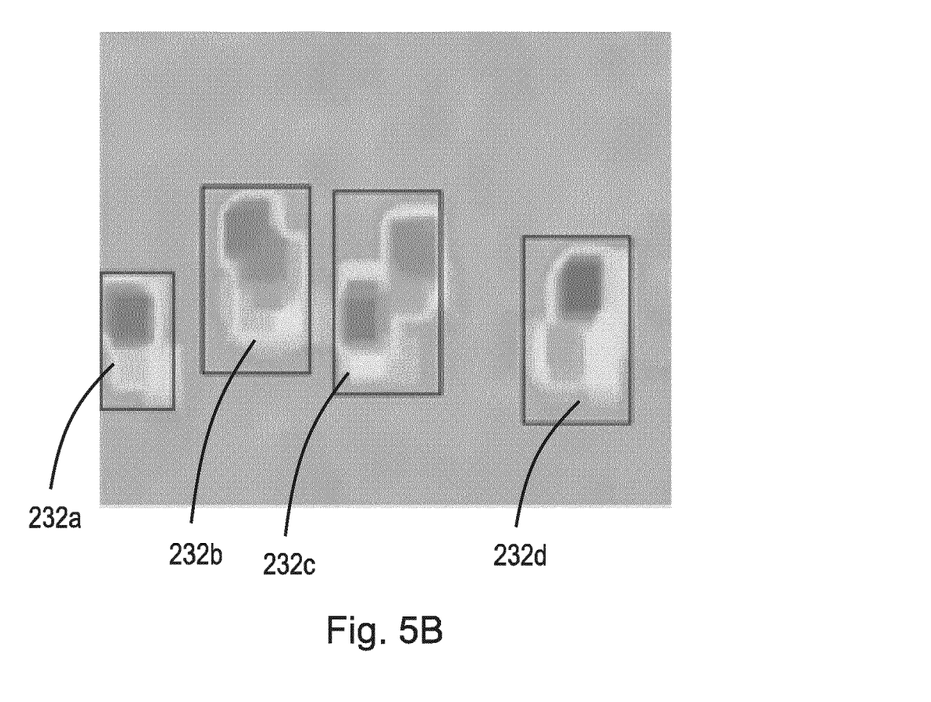

With reference to FIGS. 5A and 5B, the controller 204 may be further configured to translate the regions of interest 222a-222d from the second sensor domain 220 to the first sensor domain 214. This translation between the sensor domains is required due to the first 206 and second 208 sensor groups having different fields of view. Accordingly, the translation of the regions of interest 222a-222d may be based on field-of-view mapping.

As shown in FIG. 5A, the segmented second sample set 218 contains four regions of interest 222a-222d (corresponding to the five chairs). In a people-counting application, these areas are selected as regions of interest 222a-222d due to the likelihood of a person being present in one of the chairs. The controller 204 translates these four regions of interest, via field-of-view mapping, into the sensor domain 214 of the first sample set 212. FIG. 5B shows how these translated regions of interest 232a-232d align with the first sample set 212. As the translated regions of interest 232a-232d closely correlate to the most important portions of the first sample set 212, the controller 204 can optimize the neural network 202 by focusing on the nodes 224 which process these translated regions of interest 232a-232d.

The controller 204 may be further configured to identify one or more nodes 224 of the neural network 202 which correspond to the translated region of interest 232 based on a binary matrix 226. Identifying these nodes 224 allows the controller 204 to optimize the neural network 202 by emphasizing the most important nodes 224 for processing the samples captured by the first sensor group 206. The binary matrix 226 may include one or more zero entries 228 corresponding to areas outside of the translated region of interest 234. For example, in FIG. 5, the areas outside of the translated regions of interest 234 correspond to the areas of the thermal image outside of the four rectangles. Similarly, the binary matrix 226 may include one or more non-zero entries corresponding to the areas within the translated region of interest 234. The binary input matrix 226 may be equal in dimension to the first sample set 212. Accordingly, the binary matrix 226 may represent the translated regions of interest 232 as ones, and the remainder of the first sensor domain 214 as zeros.

Figure 6:
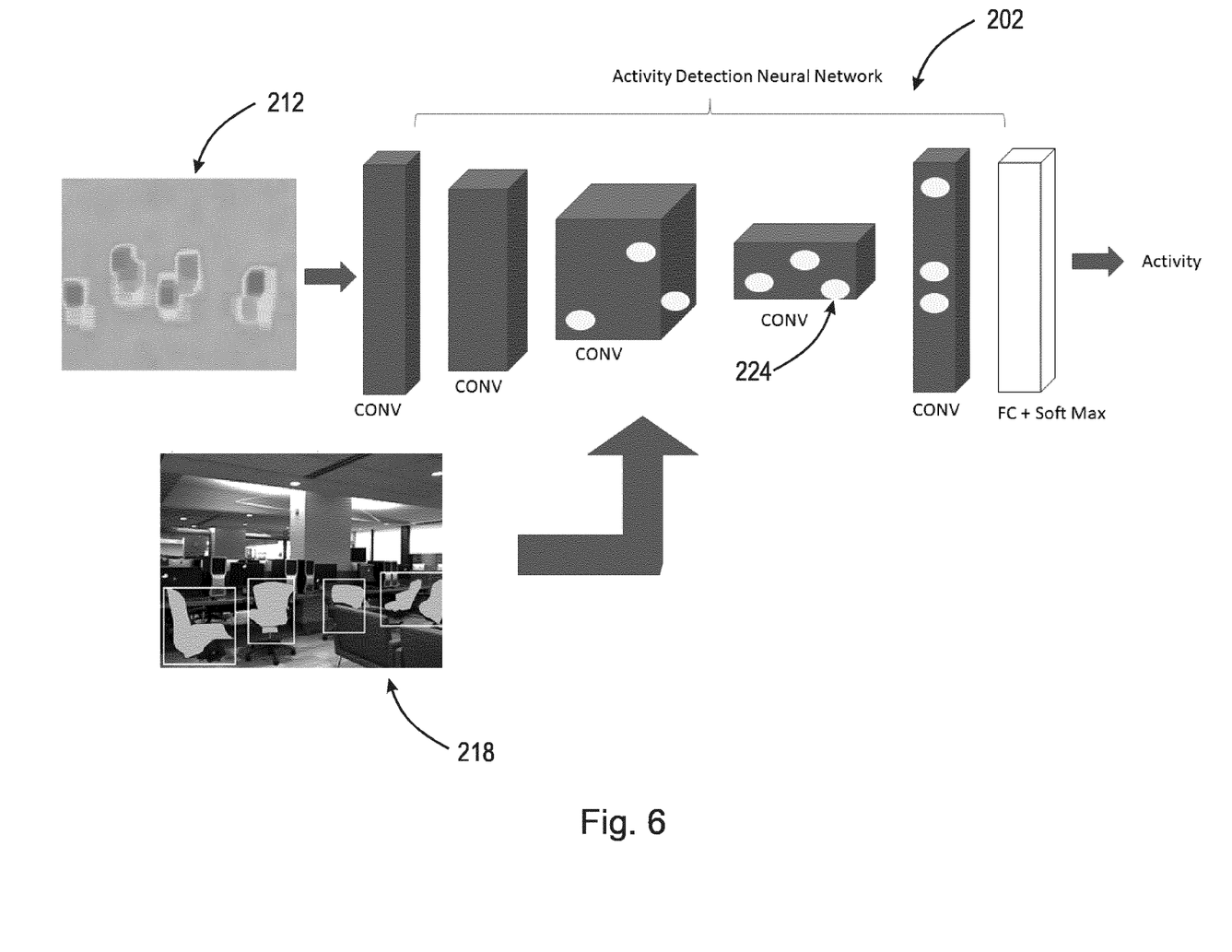
FIG. 6 demonstrates how the system optimizes a neural network based on data captured by a passive infrared sensor, in accordance with an example.

Once the binary matrix 226 is generated, the nodes 224 of the neural network 202 corresponding to the translated regions of interest 232 may be identified by (1) feeding the binary input matrix 226 into the neural network 202 and (2) detecting the nodes 224 of the neural network 202 which are activated by feeding and processing the binary matrix 226. As shown in FIG. 6, the controller 204 identifies groupings of nodes 224 (illustrated by ovals) in the intermediate layers of the neural network 202 which process the non-zero entries of the binary matrix 226.

By performing the above feeding and detection steps, the controller 204 is able to identify the nodes 224 of the layers (both initial and intermediate) of the neural network 202 which process the portions of the first sample set 212 corresponding to the regions of interest 222 of the second sample set 218. As described herein, the controller 204 may then optimize the neural network 202 to focus on these portions of the first sample set 212, resulting in more efficient processing. This identification enables an improvement over standard data compression protocols. While standard data compression only involves the initial layers of the neural network 202, this feeding and detection process allows for optimization of the deeper, inner layers of the neural network 202, resulting in a more focused neural network 202.

The controller 204 may be further configured to optimize the neural network 202 by at least one of (1) increasing the weight value 230 of the nodes 224 corresponding to the one or more translated regions of interest 232 (2) decreasing the weight value 230 of the nodes 224 not corresponding to the one or more translated regions of interest 232. By increasing and/or decreasing the weight values 230 of certain groupings of nodes 224, the controller 204 may focus the deeper, intermediate layers of the neural network 202 to receptive fields corresponding to relevant regions of the monitored area. For example, the neural network 202 may be implemented in a workspace for activity recognition as part of a connected lighting network including the first and second sensor groups 206, 208 and one or more luminaires. Rather than processing data representative of the entire workspace (and therefore the entire receptive field of the first sample set 212) equally, neural network 202 may be optimized to focus on the portions of the workspace likely to experience activity at the present time. For example, if an afternoon lull in the office results in more activity in the break room, then the neural network 202 may focus on the break room by increasing the weight values 230 of the nodes 224 which process data related to the break room, and reducing the weight values of all other nodes 224. Based on this activity detection, the connected lighting system may then control one or more luminaires to turn on, turn off, dim, brighten, blink, or otherwise operate accordingly.

Figure 7A:
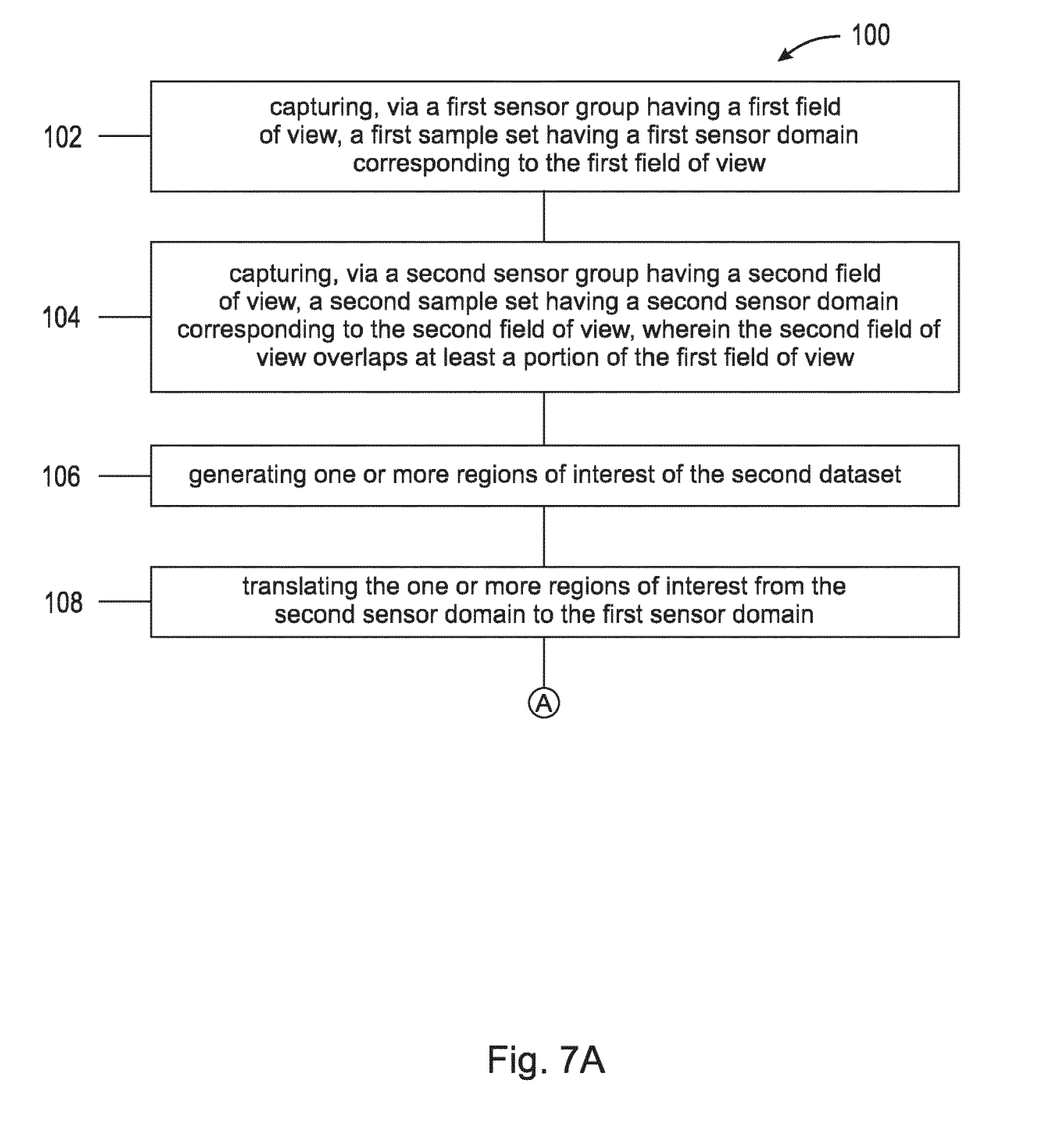
FIGS. 7A and 7B are portions of a flowchart of a method for optimizing a neural network, in accordance with an example.
Figure 7B:
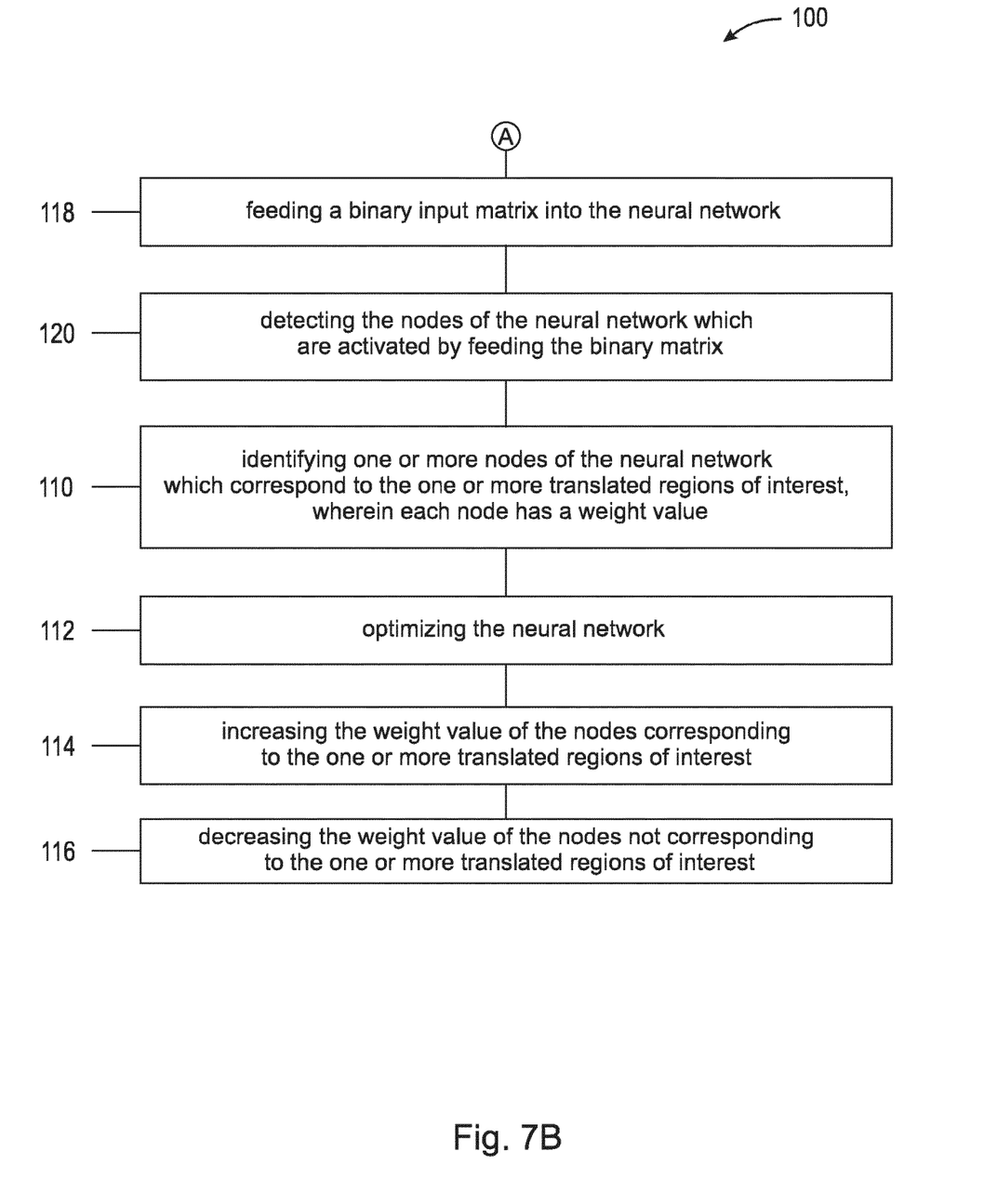

Referring to FIGS. 7A and 7B, in another aspect, a method 100 for optimizing a neural network is provided. The method 100 may include capturing 102, via a first sensor group having a first field of view, a first sample set. The first sample set may have a first sensor domain. The first sensor domain may correspond to the first field of view. The first sample set may be a thermal image corresponding to the first field of view.

The method 100 may further include capturing 104, via a second sensor group having a second field of view, a second sample set. The second sample set may have a second sensor domain. The second sensor domain may correspond to the second field of view. The second field of view may overlap at least a portion of the first field of view. The first sample set may be larger in size than the second sample set.

The method 100 may further include generating 106 one or more regions of interest of the second sample set. The one or more regions of interest may be generated based on at least an object segmentation algorithm. The one or more regions of interest are generated based on at least a user preference dataset.

The method 100 may further include translating 108 the one or more regions of interest from the second sensor domain to the first sensor domain.

The method 100 may further include identifying 110 one or more nodes of the neural network which correspond to the one or more translated regions of interest. The neural network may include a plurality of layers. Each layer may include a plurality of nodes. Each node may have a weight value.

The nodes of the neural network corresponding to the translated regions of interest may be identified 100 by (1) feeding 118 a binary input matrix into the neural network and (2) detecting 120 the nodes of the neural network which are activated by feeding the binary matrix. The binary input matrix may equal in dimension to the first sample set. The binary input matrix may include one or more zero entries corresponding to the areas outside of the translated regions of interest. The binary input matrix may include one or more non-zero entries corresponding to the translated regions of interest.

The method 100 may further include optimizing 112 the neural network by at least one of (1) increasing 114 the weight value of the nodes corresponding to the one or more translated regions of interest and (2) decreasing 116 the weight value of the nodes not corresponding to the one or more translated regions of interest. The weight value of the nodes not corresponding to the one or more translated regions of interest may be set to 0.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

The above-described examples of the described subject matter can be implemented in any of numerous ways. For example, some aspects may be implemented using hardware, software or a combination thereof. When any aspect is implemented at least in part in software, the software code can be executed on any suitable processor or collection of processors, whether provided in a single device or computer or distributed among multiple devices/computers.

The present disclosure may be implemented as a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some examples, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to examples of the disclosure. It will be understood that each block of the flowchart illustrations and/or block diagrams, and combinations of blocks in the flowchart illustrations and/or block diagrams, can be implemented by computer readable program instructions.

The computer readable program instructions may be provided to a processor of a, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various examples of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Other implementations are within the scope of the following claims and other claims to which the applicant may be entitled.

While various examples have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the examples described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific examples described herein. It is, therefore, to be understood that the foregoing examples are presented by way of example only and that, within the scope of the appended claims and equivalents thereto, examples may be practiced otherwise than as specifically described and claimed. Examples of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

The invention claimed is:

1. A method for optimizing a neural network, comprising:
capturing, via a first sensor group having a first field of view, a first sample set having a first sensor domain corresponding to the first field of view;
capturing, via a second sensor group having a second field of view, a second sample set having a second sensor domain corresponding to the second field of view, wherein the second field of view overlaps at least a portion of the first field of view;
generating one or more regions of interest of the second sample set; translating the one or more regions of interest from the second sensor domain to the first sensor domain;
identifying one or more nodes of the neural network which correspond to the one or more translated regions of interest, wherein each node has a weight value; and
optimizing the neural network by at least one of:
increasing the weight value of the nodes corresponding to the one or more translated regions of interest; and
decreasing the weight value of the nodes not corresponding to the one or more translated regions of interest;
wherein the nodes of the neural network corresponding to the translated regions of interest are identified by:
feeding a binary input matrix into the neural network; and
detecting the nodes of the neural network which are activated by feeding the binary matrix; and
wherein the binary input matrix is equal in dimension to the first sample set; wherein the binary input matrix comprises one or more zero entries corresponding to the areas outside of the translated regions of interest; and wherein the binary input matrix comprises one or more non-zero entries corresponding to the translated regions of interest.

2. The method of claim 1, wherein the weight value of the nodes not corresponding to the one or more translated regions of interest is set to 0.

3. The method of claim 1, wherein the first sample set is larger in size than the second sample set.

4. The method of claim 1, wherein the first sample set is a thermal image corresponding to the first field of view.

5. The method of claim 1, wherein the one or more regions of interest are generated based on at least an object segmentation algorithm.

6. The method of claim 1, wherein the one or more regions of interest are generated based on at least a user preference dataset.

7. The method of claim 1, wherein the neural network is configured to detect activity in the first field of view of the first sensor group.

8. The method of claim 7, wherein one or more luminaires of a connected lighting system are controlled based on the detection of activity in the first field of view of the first sensor group.

9. A system for optimizing a neural network, comprising:
a controller communicatively coupled to a first sensor group and a second sensor group, the first sensor group having a first field of view and configured to capture a first sample set having a first sensor domain corresponding to the first field of view, the second sensor group having a second field of view and configured to capture a second sample set having a second sensor domain corresponding to the second field of view, wherein the second field of view overlaps at least a portion of the first field of view; and
wherein the controller is configured to:
segment the region of interest from the second sample set;
translate the region of interest from the second sensor domain to the first sensor domain;
identify one or more nodes of the neural network which correspond to the translated region of interest based on a binary matrix, wherein the binary matrix comprises one or more zero entries corresponding to areas outside of the translated region of interest, and wherein each node has a weight value; and
optimize the neural network by at least one of:
increasing the weight value of the nodes corresponding to the one or more translated regions of interest; and
decreasing the weight value of the nodes not corresponding to the one or more translated regions of interest;
wherein the nodes of the neural network corresponding to the translated regions of interest are identified by:
feeding a binary input matrix into the neural network; and
detecting the nodes of the neural network which are activated by feeding the binary matrix; and
wherein the binary input matrix is equal in dimension to the first sample set;
wherein the binary input matrix comprises one or more zero entries corresponding to the areas outside of the translated regions of interest; and wherein the binary input matrix comprises one or more non-zero entries corresponding to the translated regions of interest.

10. The system of claim 9, wherein the first sensor group comprises at least one multipixel thermopile.

11. The system of claim 9, wherein the second sensor group comprises at least one passive infrared sensor, one microphone and/or one camera.

* * * * *